United States Patent

[11] 3,542,489

| [72] | Inventor | Axel Von Starck<br>Remscheid-Luttringhausen, Germany |
|---|---|---|
| [21] | Appl. No. | 774,797 |
| [22] | Filed | Nov. 12, 1968 |
| [45] | Patented | Nov. 24, 1970 |
| [73] | Assignee | AEG-Elotherm G.m.b.H. |
| [32] | Priority | Dec. 12, 1967 |
| [33] | | Germany |
| [31] | | No. P16-53807.1 |

[54] ELECTROMAGNETIC INDUCTION PUMP FOR THE TRANSPORT OF LIQUID METALS
3 Claims, 3 Drawing Figs.

[52] U.S. Cl. .................................................. 417/50
[51] Int. Cl. ................................................ F04b 19/00
[50] Field of Search ........................................ 103/1, 1M,
1E, 1H; 230/1; 310/12; 417/50

[56] References Cited
UNITED STATES PATENTS
| 3,273,336 | 9/1966 | Kidwell ........................ | 103/1X |
| 3,288,069 | 11/1969 | Michave ....................... | 103/1 |

*Primary Examiner*—Robert M. Walker
*Attorney*—Frederic B. Schramm

ABSTRACT: Electrical efficiency is increased by a novel arrangement of the turns of a straight line, polyphase, alternating current winding employed for subjecting molten metal in a channel to a translational magnetic field. Partial cancellation of the radial component of the electromagnetic traveling field, for inducing inductive currents in the liquid metal, is overcome by dividing each winding into pairs of semicircular conductors with the semicircular conductors at the top half of the winding, offset 180° in electrical space phase from the corresponding semicircular conductors at the lower half of the winding, and so connecting them electrically that the magnetic field from each semicircular conductor at a given position of the liquid metal channel flows in the same direction through the molten metal.

Patented Nov. 24, 1970
3,542,489
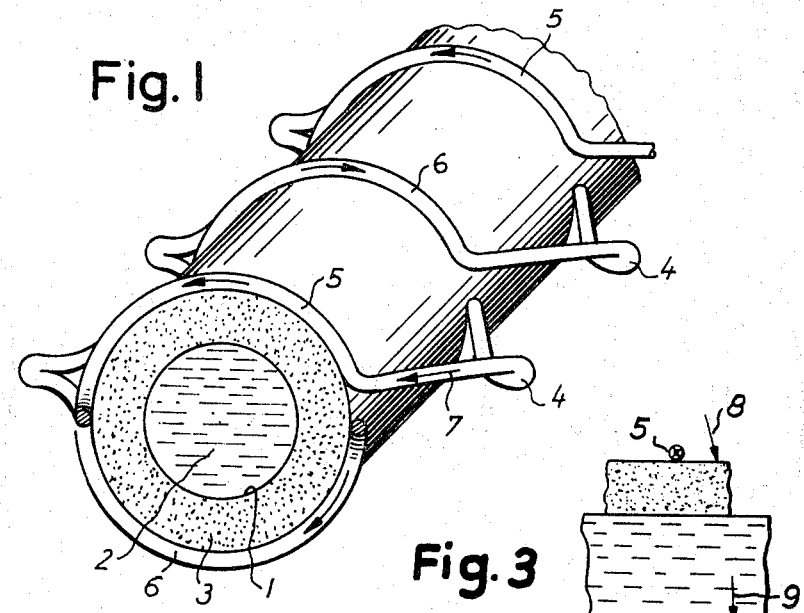
Fig. 1
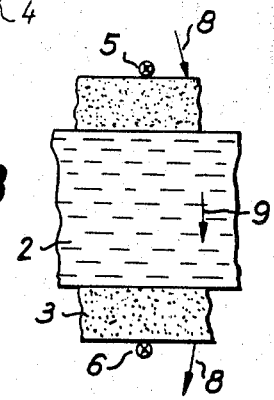
Fig. 3
Fig. 2
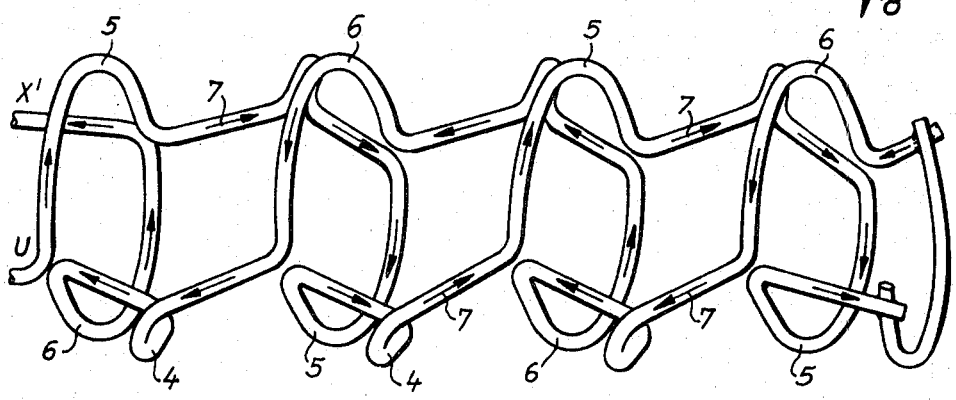
Inventor:
AXEL VON STARCK
BY Frederic B. Schramm
ATTORNEY

ELECTROMAGNETIC INDUCTION PUMP FOR THE TRANSPORT OF LIQUID METALS

For the transport of liquid metals, linear cylindrical, electromagnetic induction pumps have been proposed which are so constructed that an inductor envelops the channel for the liquid metal, usually covered with fireproof material. The inductor used for such induction pumps consists of radially arranged stacks of laminated magnetic sheets, having slots in which the conductors of a polyphase winding are mounted. The winding, being connected to a source of polyphase alternating current, produces an electromagnetic traveling field, progressing in the longitudinal direction of the inductor. The radial component of the electromagnetic traveling field induces inductive currents in the liquid metal. These, in the same manner as in an induction motor, cooperate with the progressing electromagnetic traveling field to exert a force upon a liquid metal in the longitudinal direction of the inductor, with the result that the metal is transported in the channel.

In the inductors for induction pumps heretofore proposed the polyphase winding consists of cylindrical coils which are electrically so connected with each other that groups of coils of the individual phases follow each other in alternating succession. However, the radially acting components of the electromagnetic traveling field in such a coil arrangement partially cancel each other by mutual interference. In the center of the channel they totally cancel each other with the flow of electrical current so that the resulting field intensity of electromagnetic traveling field is reduced to zero at the center of the channel. The mutual superposition of the radial components of the electromagnetic field results in weakened field intensity and a relatively low feed pressure for the metal in the channel, so that such induction pumps operate with a very low conveying efficiency.

It is an object of the invention to improve the feed performance by increasing the conveying pressure for the liquid metal in the channel for a given value of current in the inductor. This is accomplished by forming the coil of each inductor phase of pairs of semicircular conductors for each winding and employing such electrical connections as to send an equally directed phase current through the semicircular conductors forming one winding.

A better understanding of the invention will be afforded by the following detailed description considered in conjunction with the accompanying drawing in which:

FIG. 1 is a schematic fragmentary diagram in perspective and showing a cross section through an induction pump represented as cut a plane perpendicular to the axis of the molten metal channel.

FIG. 2 is a schematic perspective fragmentary diagram of a phase winding of an inductor employed in the apparatus of FIG. 1; and FIG. 3 is a fragmentary view of a section of the induction pump of FIG. 1 represented as cut by a vertical longitudinal plane through the axis of the molten metal channel.

Like reference characters are utilized throughout the drawing to designate like parts.

As illustrated in FIG. 1, the induction pump includes a channel 1 through which liquid metal 2 is transported under pressure. The channel 1 is enveloped by a fireproof covering 3. There is an inductor coil represented by a reference numeral 4 and the fireproof covering 3 preferably extends to the edge of the inductor coil 4. The inductor coil 4 is divided into phase windings which consist of a number of semicircular coil conductors 5 and 6. These are connected with each other in such a manner that the coil conductors forming a group of coils of one half of the winding are alternately followed by coil conductors forming a group of half-turns of the other winding half, which thus produce a half coil. Two similar coil halves are so connected that two semicircular coil conductors electrically opposing each other in a plane form one winding turn. As a result of the connection of the phase windings to the appropriate phase currents, for example to the phase U-X, a current of uniform direction flows through the coil conductors 5 and 6 in any plane, as indicated by the arrows 7. The currents oppose each other with respect to the usual path around the axis of a coil but act jointly with respect to a path transverse to the coil axis and the channel axis.

The currents of identical phase current produce, in the conductors in each plane, electromagnetic field-of-force lines 8 of identical direction. As illustrated in FIG. 3 the field-of-force lines from the conductors 5 and 6 do not neutralize but reenforce each other to form a resultant field-of-force having a direction 9 which is transverse to the channel axis through the molten metal 2 in the center as well as near the edges. By reason of the intensified field-of-force, high pressure is exerted upon the liquid metal 2 in the channel 1. In this manner field efficiency is considerably increased for constant-value root-mean-square alternating conductor current.

While the invention has been described as embodied in concrete form and as operating in a specific manner in accordance with the provisions of the Patent Statutes, it should be understood that the invention is not limited thereto, since various modifications will suggest themselves to those skilled in the art without departing from the spirit of the invention.

I claim:

1. An electromagnetic induction pump for the transport of liquid metal in a circular channel comprising a polyphase winding with a coil for each phase, each coil comprising integral units, each comprising a plurality of semicircular conductor pairs with the units electrically connected to cause the phase current in each portion of the winding to flow in the same direction with respect to the liquid metal channel.

2. A phase winding for an inductor for an electromagnetic induction pump as described in claim 1 comprising two units, each forming a winding half having the semicircular conductors connected with each other to form a group of conductors of one winding half alternately followed by conductors of the other winding half, with each semicircular conductor of one winding lying in a common plane with a semicircular conductor of the other winding half, the semicircular conductors being electrically connected so that two semicircular conductors electrically opposing each other in each plane form the winding.

3. An induction pump comprising phase windings as described in claim 2 and circular cross section ceramic conduit, said conduit being embraced by said windings.